United States Patent
Ogasawara et al.

(10) Patent No.: US 9,950,622 B2
(45) Date of Patent: Apr. 24, 2018

(54) VEHICLE DISPLAY CONTROL DEVICE AND VEHICLE DISPLAY SYSTEM

(71) Applicant: DENSO CORPORATION, Kariya, Aichi-pref. (JP)

(72) Inventors: Akihiro Ogasawara, Kariya (JP); Kiyotaka Taguchi, Kariya (JP); Gouji Sagai, Kariya (JP); Kentaro Kajita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/326,970

(22) PCT Filed: Jul. 20, 2015

(86) PCT No.: PCT/JP2015/003633
§ 371 (c)(1),
(2) Date: Jan. 17, 2017

(87) PCT Pub. No.: WO2016/013203
PCT Pub. Date: Jan. 28, 2016

(65) Prior Publication Data
US 2017/0203653 A1 Jul. 20, 2017

(30) Foreign Application Priority Data
Jul. 23, 2014 (JP) .................. 2014-150099

(51) Int. Cl.
*G06T 13/00* (2011.01)
*B60K 37/02* (2006.01)
(Continued)

(52) U.S. Cl.
CPC ............. *B60K 37/02* (2013.01); *G06T 3/40* (2013.01); *G06T 3/60* (2013.01); *G06T 13/80* (2013.01);
(Continued)

(58) Field of Classification Search
None
See application file for complete search history.

(56) References Cited

U.S. PATENT DOCUMENTS

2003/0065753 A1* 4/2003 Taninaka .......... H04L 29/12311
709/220
2009/0177791 A1* 7/2009 Edelstein .............. H04L 67/025
709/229

(Continued)

FOREIGN PATENT DOCUMENTS

EP 2480003 A1 7/2012
JP 2012142813 A 7/2012

OTHER PUBLICATIONS

Harumoto et al., Onboard System and Mobile Terminal Apparatus, Sep. 2, 2010, JP 2010193319 A.*

*Primary Examiner* — Martin Mushambo
(74) *Attorney, Agent, or Firm* — Harness, Dickey & Pierce, P.L.C.

(57) ABSTRACT

A vehicle display control device includes a timing determination unit that determines timing when it is authenticated that the mobile terminal is an object that can provide the mobile screen information after the start of processing of connection between an HCU and the mobile terminal. A display control unit displays a during-connection-processing image indicating that connection with the mobile terminal is being processed, on the display device after the timing is determined by the timing determination unit until the mobile screen information becomes possible to be displayed on the display device. The display control unit does not display the during-connection-processing image on the display device after the connection processing is started until the timing is determined by the timing determination unit.

16 Claims, 11 Drawing Sheets

(51) Int. Cl.
   *G06T 13/80*       (2011.01)
   *G06T 3/40*        (2006.01)
   *G06T 3/60*        (2006.01)
(52) U.S. Cl.
   CPC .............................. *B60K 2350/106* (2013.01); *B60K 2350/2017* (2013.01); *B60K 2350/352* (2013.01)

(56) References Cited

U.S. PATENT DOCUMENTS

| | | | | |
|---|---|---|---|---|
| 2013/0144487 A1* | 6/2013 | Suzuki | .................... | G06F 17/00 701/36 |
| 2014/0320528 A1* | 10/2014 | Nanba | .................... | B60K 35/00 345/629 |

* cited by examiner

VEHICLE DISPLAY CONTROL DEVICE AND VEHICLE DISPLAY SYSTEM

CROSS REFERENCE TO RELATED APPLICATIONS

This application is a U.S. National Phase Application under 35 U.S.C. 371 of International Application No. PCT/JP2015/003633 filed on Jul. 20, 2015 and published in Japanese as WO 2016/013203 A1 on Jan. 28, 2016. This application is based on and claims the benefit of priority from Japanese Patent Application No. 2014-150099 filed on Jul. 23, 2014. The entire disclosures of all of the above applications are incorporated herein by reference.

TECHNICAL FIELD

The present disclosure relates to a vehicle display control device for displaying screen information provided from a mobile terminal on a display device and a vehicle display system including the vehicle display control device.

BACKGROUND ART

Conventionally, there has been known a technique in which a mobile terminal such as a smartphone is connected to an electronic device and information handled by the mobile terminal is also used by the electronic device. For example, Patent Literature 1 discloses a technique in which a mobile terminal is connected to a vehicle display device by wire or by wireless and screen information displayed on the mobile terminal is displayed on the display unit of an in-vehicle electronic device. In the technique disclosed in Patent Literature 1, it is confirmed whether or not the in-vehicle electronic device and the mobile terminal are mutually connected through a connection unit. Then, when the connection is confirmed, a shift to a mode in which the screen information displayed on the mobile terminal is displayed on the display unit of the in-vehicle electronic device is performed, and the screen information is transmitted from the mobile terminal to the in-vehicle electronic device and displayed on the display unit of the in-vehicle electronic device.

PRIOR ART LITERATURE

Patent Literature

Patent Literature 1: JP 2012-142813 A

SUMMARY OF INVENTION

In the technique disclosed in Patent Literature 1, the image is not displayed on the display unit of the in-vehicle electronic device after the processing of connection between the mobile terminal and the in-vehicle electronic device is started until the in-vehicle electronic device receives the screen information of the mobile terminal. A time period after the connection processing is started until the screen information of the mobile terminal is displayed on the display unit of the in-vehicle electronic device is a waiting time for a user, and when the image is not displayed on the display unit of the in-vehicle electronic device during the waiting time, the user cannot grasp the situation and feels uncomfortable.

When an indication that the connection between the mobile terminal and the in-vehicle electronic device is being processed is displayed on the display unit of the in-vehicle electronic device during the waiting time after the connection processing is started until the screen information of the mobile terminal is displayed on the display unit of the in-vehicle electronic device, the user could grasp the situation. However, when the indication that the connection is being processed lasts long, the user feels the waiting time long. Further, when the indication that the connection is being processed lasts long, the user wonders when the connection processing will end, and gazes at the display, which might hinder driving.

It is an object of the present disclosure to provide a vehicle display control device and a vehicle display system that can restrict a user from feeling a waiting time required from the start of connection processing to the display of screen information to be long while hardly hindering driving when connecting a mobile terminal to the vehicle display control device and displaying the screen information provided from the mobile terminal on a display device.

A vehicle display control device according to an aspect of the present disclosure is mounted in a vehicle, and includes: a reception unit that receives screen information provided from a mobile terminal connected to the vehicle display control device; a display control unit that displays, on a display device, the screen information received by the reception unit from the mobile terminal; and a timing determination unit that determines a predetermined timing in a lapse of time after processing of connection between the vehicle display control device and the mobile terminal is started. The display control unit displays a during-connection-processing image indicating that connection with the mobile terminal is being processed, on the display device in a time period after the timing is determined by the timing determination unit until the screen information becomes possible to be displayed on the display device. The display control unit does not display the during-connection-processing image on the display device in a time period after the connection processing is started until the timing is determined by the timing determination unit.

A vehicle display system according to an aspect of the present disclosure includes the vehicle display control device and a display device that displays an image in accordance with the vehicle display control device.

According to these configurations, the during-connection-processing image indicating that connection with the mobile terminal is being processed is displayed only in the time period after the predetermined timing in a lapse of a time after the processing of connection between the vehicle display control device and the mobile terminal is started is determined by the timing determination unit until the screen information becomes possible to be displayed on the display device. Therefore, in comparison with the case for displaying the during-connection-processing image after the connection processing is started until the screen information becomes possible to be displayed on the display device, it is possible to shorten the indication that connection is being processed and make the user hardly feel the waiting time long. Further, by shortening the indication that connection is being processed, it is possible to reduce occasions where the user gazes at the display to see when the connection processing will end, and therefore hardly hinder driving.

Consequently, it is possible to restrict the user from feeling the waiting time required from the start of connection processing to the display of the screen information to be long while hardly hindering driving when connecting the mobile terminal to the vehicle display control device and displaying the screen information provided from the mobile terminal on the display device.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS (First Embodiment)
<General Configuration of Vehicle Display System 100>

Figure 1:
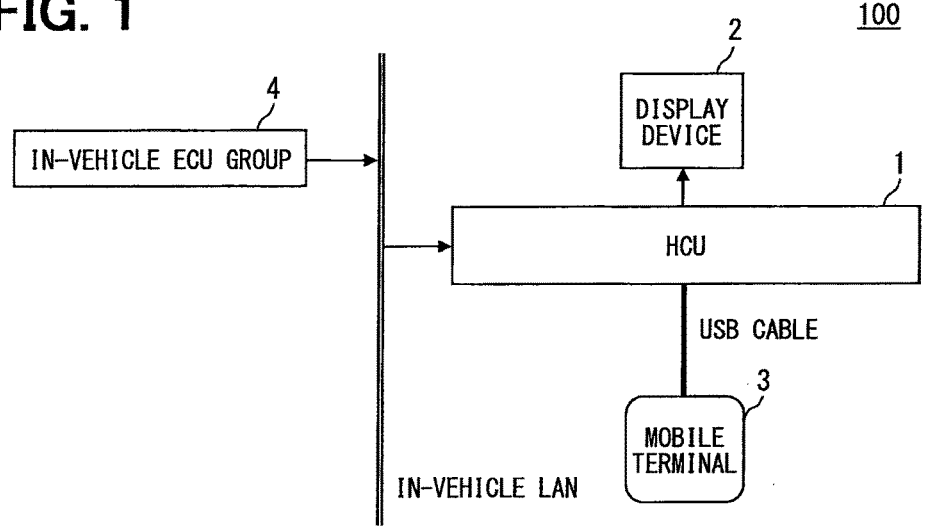
FIG. 1 is a block diagram showing an example of the general configuration of a vehicle display system.

FIG. 1 is a diagram showing an example of the general configuration of a vehicle display system 100 to which the present disclosure is applied. The vehicle display system 100 includes an HCU (Human Machine Interface Control Unit) 1, a display device 2, a mobile terminal 3, and an in-vehicle ECU group 4, as shown in FIG. 1. In the vehicle display system 100, the HCU 1 receives screen information (hereinafter referred to as mobile screen information) provided from the mobile terminal 3, and displays it on the display device 2. A configuration composed of the HCU 1 and the display device 2 corresponds to a vehicle display system.

While the HCU 1 and the mobile terminal 3 may be connected by wire or by wireless in the vehicle display system 100, the present embodiment will be described by way of example in which the HCU 1 and the mobile terminal 3 are USB-connected by a USB cable.

When the HCU 1 and the mobile terminal 3 are connected by wireless, they can be connected in accordance with a wireless LAN standard such as IEEE802.11 or a short-range wireless communication standard such as Bluetooth (registered trademark). Further, the in-vehicle ECU group 4 and the HCU 1 can be connected via an in-vehicle LAN for example, and the HCU 1 and the display device 2 can be connected by wire for example.

The display device 2 is mounted in a vehicle, and displays text and images in accordance with an instruction of the HCU 1. The display device 2 can perform full-color display, and can be formed of a liquid crystal display or the like. While the display device 2 may be formed of an HUD (Head-Up Display), the present embodiment will be described by way of example using the display disposed at the driver's seat front of an instrument panel.

The mobile terminal 3 is a device that can be carried in the vehicle, having a communication function and an image display function such as a known smartphone or tablet terminal. When processing of connection with the HCU 1 is completed and communication is established, the mobile terminal 3 sequentially transmits the information of the size of an image displayed on the screen of the present terminal (hereinafter referred to as the information of an image size) and the information of the image displayed on the screen of the present terminal (hereinafter referred to as mobile screen information) to the HCU 1. The image displayed on the screen of the mobile terminal 3 transitions in accordance with a user operation and a program execution result.

The in-vehicle ECU group 4 is composed of ECUs mounted in the vehicle, and acquires information about vehicle states (hereinafter referred to as vehicle information) via the in-vehicle LAN or the like from various sensors in the vehicle. For example, the in-vehicle ECU group 4 acquires a vehicle speed, an engine speed, a remaining fuel amount, an engine cooling water temperature, a cumulative travel distance, a shift position, a direction indicator lever position, a door locking/unlocking state, a seat belt wearing state, a light illumination state, and the like, as vehicle information.

The HCU 1 is mainly configured as a microcomputer, and is formed of known CPU, memories such as ROM and RAM, I/O, and buses for connecting them. The HCU 1 causes the display device 2 to perform various displays based on various kinds of information inputted from the mobile terminal 3 and the in-vehicle ECU group 4. The HCU 1 corresponds to a vehicle display control device.

Some or all of the functions executed by the HCU 1 may be configured as hardware by one or more ICs or the like.
<Detailed Configuration of HCU 1>

Figure 2:
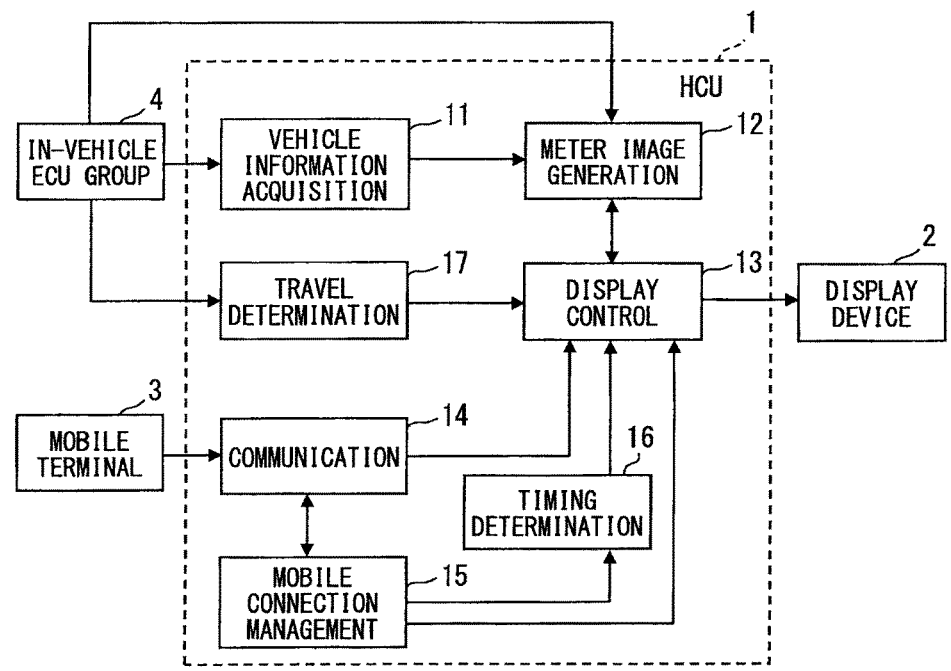
FIG. 2 is a block diagram showing an example of the general configuration of an HCU.

As shown in FIG. 2, the HCU 1 includes a vehicle information acquisition unit 11, a meter image generation unit 12, a display control unit 13, a communication unit 14, a mobile connection management unit 15, a timing determination unit 16, and a travel determination unit 17.

The vehicle information acquisition unit 11 sequentially acquires the vehicle information from the in-vehicle ECU group 4. The vehicle information acquisition unit 11 may be not only configured to acquire the vehicle information from the in-vehicle ECU group 4, but also configured to acquire the vehicle information from various sensors in the vehicle.

The meter image generation unit 12 generates a meter image in which images (hereinafter referred to as element images) imitating various instrument displays and various indicator displays of the vehicle are disposed in a predetermined layout, based on the vehicle information sequentially acquired by the vehicle information acquisition unit 11, and outputs the meter image to the display control unit 13.

The element images imitating the instrument displays include element images respectively imitating, e.g., a speed meter, a rotation meter, and the like. Further, the element images imitating the indicator displays include element images respectively imitating indicators indicating direction indication lever positions and indicators warning non-wearing of a seat belt, unlocking of a door, a door being incompletely closed, abnormality of oil, and the like.

There are a plurality of types of layouts of various element images in the meter image, and the meter image generation unit 12 switches and adopts each layout, based on the instruction of the display control unit 13. The present embodiment will be described by way of example using two types of layouts, i.e., a first layout and a second layout.

The first layout is a layout adopted at the time of displaying, on the display device 2, only the meter image not including a display region for the mobile screen information provided from the mobile terminal 3 and an image related to connection with the mobile terminal 3 such as an image indicating that connection with the mobile terminal 3 is being processed (hereinafter referred to as a during-connection-processing image). On the other hand, the second layout is a layout including the display region for the image related to connection with the mobile terminal 3. Specific examples of the meter image where these layouts are adopted will be described later. The element images in the meter image are rendered in a display mode according to the adopted layout.

Figure 3:
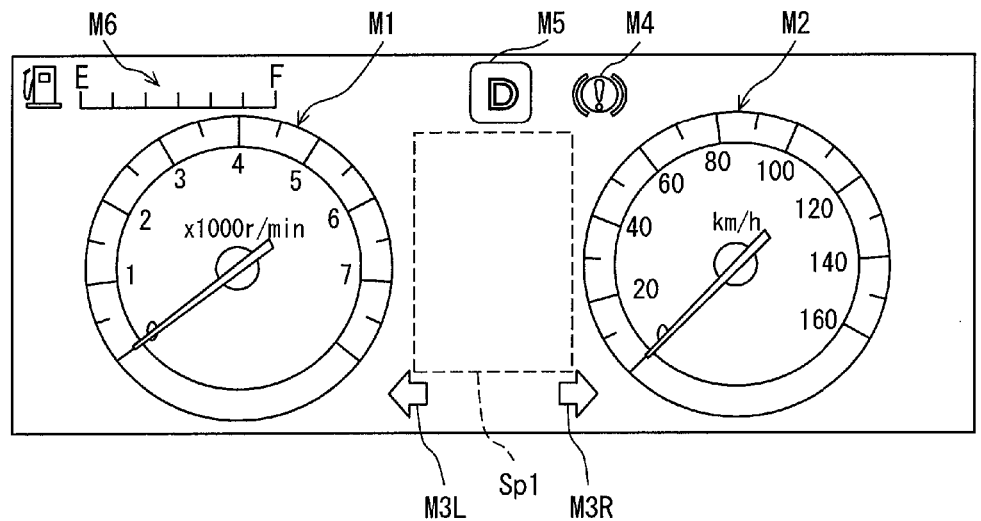
FIG. 3 is a diagram showing an example of a first layout.
Figure 4:
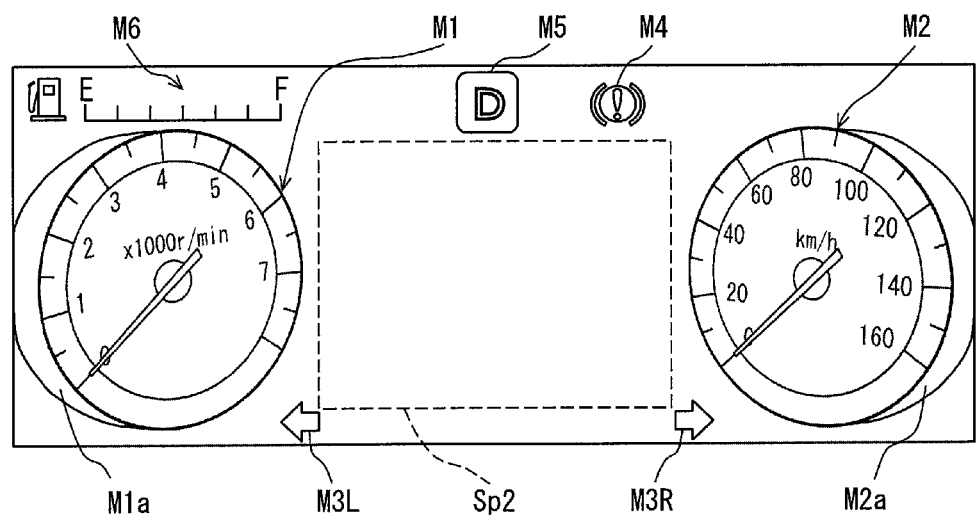
FIG. 4 is a diagram showing an example of a second layout.

With reference to FIGS. 3 and 4, examples of the first and second layouts will be described. FIG. 3 is a diagram showing an example of the first layout, and FIG. 4 is a diagram showing an example of the second layout. FIGS. 3 and 4 will be described by way of example of element images including a rotation speed meter M1, a vehicle speed meter M2, direction indication icons M3L, M3R, a warning icon M4, a shift position icon M5, and a remaining fuel amount image M6.

The rotation speed meter M1 is an image showing an engine speed, and is a display mode imitating a so-called analog meter. More specifically, in accordance with an engine speed detected by an engine speed sensor, the rotation speed meter M1 rotates a pointer on a substantially circular dial marked with graduations and numerical values on a circumference, thereby indicating the current engine speed.

In the present embodiment, the rotation speed meter M1 is an image generated based on a substantially cylindrical three-dimensional model (hereinafter referred to as a rotation speed meter model) whose top face is the dial of the engine speed and whose height is smaller than the radius of the top face. As shown in FIG. 3, the rotation speed meter M1 in the first layout is an image of the dial of the rotation speed meter model viewed from the front.

The vehicle speed meter M2 is an image showing a vehicle speed. As with the rotation speed meter M1, the vehicle speed meter M2 is also a display mode imitating a so-called analog meter. More specifically, in accordance with a vehicle speed detected by a vehicle speed sensor, the vehicle speed meter M2 rotates a pointer on a substantially circular dial marked with graduations and numerical values on a circumference, thereby indicating the current vehicle speed. Further, the vehicle speed meter M2 is also an image generated based on a substantially cylindrical three-dimensional model (hereinafter referred to as a vehicle speed meter model) whose top face is the dial of the vehicle speed and whose height is smaller than the radius of the top face. As shown in FIG. 3, the vehicle speed meter M2 in the first layout is an image of the dial of the vehicle speed meter model viewed from the front.

The direction indication icons M3L, M3R are icons indicating the lighting state of direction indicator lamps. The display mode of the direction indication icons M3L, M3R is switched in accordance with output signals of an indicator switch and a hazard switch.

The warning icon M4 is an icon for informing an occupant of the abnormality of the vehicle, and is displayed in accordance with the input, from the in-vehicle ECU group 4, of information that a drive system such as an engine or a body system is abnormal.

The shift position icon M5 is an icon showing a shift position, and the display mode is switched in accordance with a shift position detected by a shift position sensor. The remaining fuel amount image M6 is an image showing a remaining fuel amount.

As shown in FIG. 3, in the first layout, the rotation speed meter M1 and the vehicle speed meter M2 are disposed in parallel with each other with a predetermined space in a lateral direction. A region Sp1 sandwiched between the rotation speed meter M1 and the vehicle speed meter M2 is smaller than a later-described mobile screen display region Sp2 sandwiched between the rotation speed meter M1 and the vehicle speed meter M2 in the second layout.

On the other hand, as shown in FIG. 4, in the second layout, the rotation speed meter M1 and the vehicle speed meter M2 are disposed more apart in the lateral direction than in the first layout, and there is provided the mobile screen display region Sp2 having a size that enables the mobile screen information provided from the mobile terminal 3 to be displayed between the rotation speed meter M1 and the vehicle speed meter M2.

The mobile screen display region Sp2 is not only the region for disposing an image as the mobile screen information provided from the mobile terminal 3, but also the region for disposing the image related to connection with the mobile terminal 3 such as the during-connection-processing image.

Further, in the second layout, to ensure the mobile screen display region Sp2, not only by moving the rotation speed meter M1 and the vehicle speed meter M2 in the lateral direction, but also by making images of the rotation speed meter model and the vehicle speed meter model viewed from slightly oblique directions as shown in FIG. 4, the area that the dial occupies in the screen is reduced. More specifically, the rotation speed meter M1 displayed on the left side is made the image of the rotation speed meter model viewed from an angle inclined to the left side from the front of the dial, and the vehicle speed meter M2 displayed on the right side is made the image of the vehicle speed meter model viewed from an angle inclined to the right side from the front of the dial, thereby increasing the space between the rotation speed meter M1 and the vehicle speed meter M2. In FIG. 4, reference numeral M1a denotes a part of the side face of the substantially cylindrical rotation speed meter M1, and reference numeral M2a denotes a part of the side face of the substantially cylindrical vehicle speed meter M2.

When the meter image generation unit 12 is instructed by the display control unit 13 to change the layout, the meter image generation unit 12 changes the arrangement of element images and the display mode from the currently adopted layout to the instructed layout. In the present embodiment, the meter image generation unit 12 sequentially outputs the meter image, showing the process of shifting from the current layout to the new layout, to the display control unit 13.

The meter image showing the process of shifting the layout is the meter image showing the process of the movement, rotation, and deformation of element images in the meter image. Alternatively, the meter image showing the process of shifting the layout may not be displayed, that is, the meter image in the stage of transition between the first layout and the second layout may not be displayed.

The display control unit 13 determines the layout of the meter image in accordance with the process of processing of connection with the mobile terminal 3, the presence or absence of travel of the vehicle, and the like, and instructs the meter image generation unit 12 to generate the meter image in the determined layout.

In addition, the display control unit 13 synthesizes the meter image inputted from the meter image generation unit 12 with a background image stored beforehand in a memory of the HCU 1 to generate an image to be displayed on the display device 2.

When the mobile screen information is inputted from the communication unit 14, the display control unit 13 generates an image in which an image as the mobile screen information is synthesized in addition to the meter image and the background image. Further, the display control unit 13 generates an image in which the during-connection-processing image etc. are synthesized in addition to the meter image and the background image, in accordance with the process of processing of connection with the mobile terminal 3 and the presence or absence of travel of the vehicle. The details of processing by the display control unit 13 in accordance with the process of processing of connection with the mobile terminal 3 and the presence or absence of travel of the vehicle will be described later.

The communication unit 14 functions as an interface for communication with the mobile terminal 3, and communicates with the mobile terminal 3. The communication unit 14 corresponds to a reception unit. The mobile connection management unit 15 manages the communication between the communication unit 14 and the mobile terminal 3, that is, the mobile connection management unit 15 performs processing of connection with the mobile terminal 3 in accordance with a USB protocol, and authenticates whether the connected mobile terminal 3 is an object that can provide the mobile screen information. The details of processing by the mobile connection management unit 15 as well as the details of the timing determination unit 16 and the travel determination unit 17 will be described later.

<Mobile Screen Display Processing>

Mobile screen display processing by the HCU 1 will be described with reference to a flowchart of FIG. 5. The mobile screen display processing is processing until the mobile screen information provided from the mobile terminal 3 is displayed on the display device 2. As an example, the flowchart of FIG. 5 can start when the power of the HCU 1 is turned on, and end when the power of the HCU 1 is turned off.

In the example of the present embodiment, when the power of the HCU 1 is turned on, the display control unit 13 instructs the meter image generation unit 12 to generate the meter image in the first layout, and displays, on the display device 2, an image in which the meter image of the adopted first layout is synthesized with the background image. This meter image corresponds to an image that has been displayed on the display device since before the start of connection processing.

First, in S1, when the mobile connection management unit 15 detects a physical connection between the HCU 1 and the mobile terminal 3 based on the signal voltage of the USB cable (YES in S1), the flow moves to S2. On the other hand, when the mobile connection management unit 15 does not detect the physical connection between the HCU 1 and the mobile terminal 3 (NO in S1), S1 is repeated until the power of the HCU 1 is turned off.

In S2, the mobile connection management unit 15 starts processing of connection with the mobile terminal 3, and requests the transfer of information of a descriptor from the mobile terminal 3. In S3, based on the descriptor transferred from the mobile terminal 3, the mobile connection management unit 15 recognizes the USB device class (USB specification group) of the mobile terminal, and performs connection processing according to the recognized USB device class.

In S4, the mobile connection management unit 15 recognizes a type such as the model of the mobile terminal 3, based on the descriptor. Then, when the mobile connection management unit 15 determines that the mobile terminal 3 is an object type that is USB-connected to the HCU 1 and can provide the mobile screen information (YES in S4), the flow moves to S5. On the other hand, when the mobile connection management unit 15 determines that the mobile terminal 3 is not the object type (NO in S4), the flow returns to S1 to repeat processing until the power of the HCU 1 is turned off. By storing the information of the type corresponding to the object type in the memory of the HCU 1, the mobile connection management unit 15 can determine, by referring to this information, whether or not the type corresponds to the object mobile terminal.

In S5, the mobile connection management unit 15 recognizes a function that the mobile terminal 3 has, based on the descriptor. As an example, based on the information of an application or the like, the mobile connection management unit 15 can recognize the function that the mobile terminal 3 has. Then, when the mobile connection management unit 15 determines that the mobile terminal 3 has an object function that is USB-connected to the HCU 1 and can provide the mobile screen information (YES in S5), the flow moves to S6. On the other hand, when the mobile connection management unit 15 determines that the mobile terminal 3 does not have the object function (NO in S5), the flow returns to S1 to repeat processing until the power of the HCU 1 is turned off. By storing information such as the version of the application having the object function in the memory of the HCU 1, the mobile connection management unit 15 can determine, by referring to this information, whether or not the mobile terminal 3 has the object function.

Since S4, S5 are steps for determining (i.e., authenticating) whether or not the mobile terminal 3 is an object that is USB-connected to the HCU 1 and can provide the mobile screen information, the mobile connection management unit 15 corresponds to an object determination unit. In the present embodiment, S4, S5 are executed; however, it can be considered that whether to have the object function can be often specified only by specifying the type of the mobile terminal 3; therefore, S5 may be omitted.

In S6, after the connection processing is completed based on the information of the descriptor and the communication between the mobile terminal 3 and the HCU 1 is established, the HCU 1 starts the control of the mobile terminal 3. In S7, the communication unit 14 acquires the information of an image size for displaying the mobile screen information on the display device 2, transmitted from the mobile terminal 3. The information of the image size acquired by the communication unit is outputted to the display control unit 13. In S8, the communication unit 14 acquires the mobile screen information transmitted from the mobile terminal 3. The mobile screen information acquired by the communication unit is outputted to the display control unit 13.

In S9, the display control unit 13 instructs the meter image generation unit 12 to generate the meter image in the second layout, and displays, on the display device 2, an image in which the mobile screen information is synthesized with the meter image of the adopted second layout and the background image. The mobile screen information is synthesized so as to be disposed in the mobile screen display region Sp2 in the second layout.

The display of the mobile screen information provided from the mobile terminal 3 continues until an instruction for ending an application for displaying the mobile screen information is issued, the USB connection is canceled, or the power of the HCU 1 is turned off. When the instruction for ending the application for displaying the mobile screen information is issued, the USB connection is canceled, or the power of the HCU 1 is turned off, the display of the mobile screen information provided from the mobile terminal 3 ends.

<During-Waiting-Time Display Processing>

Figure 5:
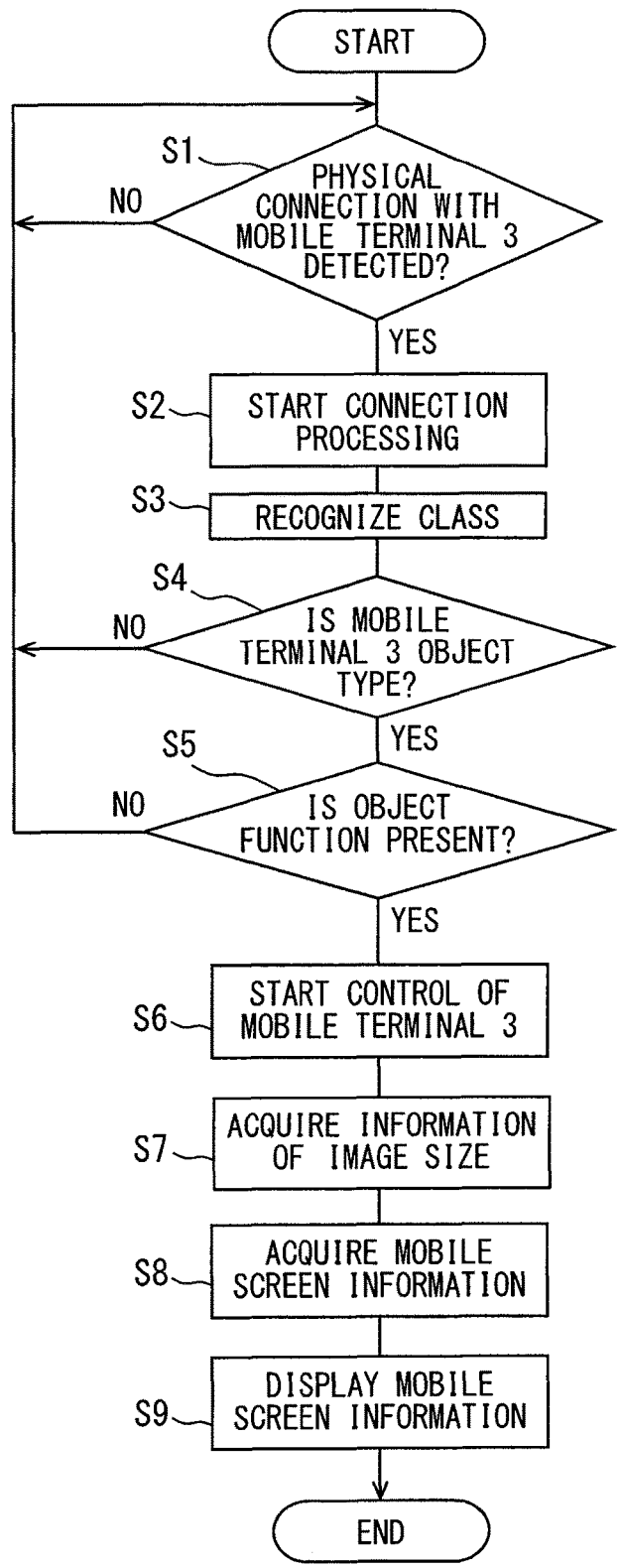
FIG. 5 is a flowchart showing an example of the flow of mobile screen display processing by the HCU.

As shown in the flowchart of FIG. 5, when the HCU 1 can acquire the mobile screen information of the mobile terminal 3, the mobile screen information is displayed on the display device 2. In addition, during a waiting time until the mobile screen information is displayed on the display device 2, the HCU 1 performs during-waiting-time display processing for displaying the during-connection-processing image indicating that connection with the mobile terminal 3 is being processed.

Hereinafter, the during-waiting-time display processing will be described with reference to a flowchart of FIG. 6. The during-waiting-time display processing starts when the processing of connection between the mobile terminal 3 and the HCU 1 starts in S2 of the flowchart of FIG. 5. When the flowchart of FIG. 6 starts, the image in which the meter image of the adopted first layout is synthesized with the background image has been displayed on the display device 2 as described above.

First, in S21, the timing determination unit 16 determines whether or not it is timing to display the during-connection-processing image. As an example, when the mobile connection management unit 15 determines that the mobile terminal 3 has the object function in S5 of the flowchart of FIG. 5, the timing determination unit 16 determines that it is timing to display the during-connection-processing image. That is, when it is authenticated that the mobile terminal 3 is an object that is USB-connected to the HCU 1 and can provide the mobile screen information, the timing determination unit 16 determines that it is timing to display the during-connection-processing image.

When the timing determination unit 16 determines that it is timing to display the during-connection-processing image (YES in S21), the flow moves to S22. On the other hand, when the timing determination unit 16 determines that it is not timing to display the during-connection-processing image (NO in S21), the step S21 is repeated.

In S22, the travel determination unit 17 determines whether or not the vehicle is during traveling, based on a vehicle speed acquired from the in-vehicle ECU group 4. Alternatively, it may be determined based on a shift position whether or not the vehicle is during traveling. When it is determined that the vehicle is during traveling (YES in S22), the flow moves to S23. On the other hand, when it is determined that the vehicle is during stopping (NO in S22), the flow moves to S25.

In S23, the display control unit 13 determines the adoption of the first layout, and instructs the meter image generation unit 12 to generate the meter image in the first layout. Then, when the control of the mobile terminal 3 is started in S6 of the flowchart of FIG. 5, the display control unit 13 displays, on the display device 2, an image in which the during-connection-processing image is synthesized with the meter image of the adopted first layout and the background image.

Figure 7:
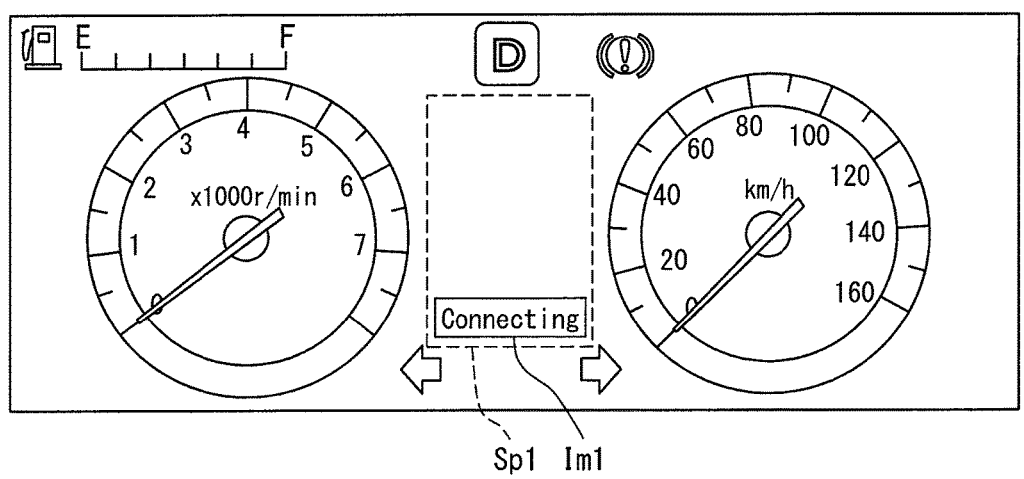
FIG. 7 is a diagram showing an example of a during-connection-processing image displayed during traveling.

The during-connection-processing image in S23 is an image that includes text indicating that connection is being processed such as "Connecting" as shown by Im1 in FIG. 7, and can be displayed in the region Sp1 of the first layout so as not to interfere with the display of each element image in the meter image. Since the vehicle is during traveling, the during-connection-processing image is displayed by a still image, not by animation, so as not to hinder a driving operation.

Thus, according to the present embodiment, although the during-connection-processing image indicating that connection is being processed is not displayed in a time period after the connection processing is started until the connection processing is completed, the during-connection-processing image is displayed in a time period after the connection processing is completed until the mobile screen information is displayed on the display device 2. Thus, by displaying the during-connection-processing image after the connection processing is completed, the user feels a time from the start of the connection processing to the display of the mobile screen information on the display device 2 to be shorter than it actually is.

In S24, when the communication unit 14 acquires the mobile screen information in S8 of the flowchart of FIG. 5 (YES in S24), the flow moves to S9. On the other hand, when the communication unit 14 does not acquire the mobile screen information (NO in S24), the flow returns to S22 to repeat processing.

In S25 after it is determined that the vehicle is during stopping in S22, the display control unit 13 determines the adoption of the second layout, and instructs the meter image generation unit 12 to generate the meter image in the second layout.

The meter image generation unit 12 instructed to generate the meter image in the second layout sequentially outputs the meter image showing the process of shifting from the first layout to the second layout to the display control unit 13, and then outputs the meter image of the adopted second layout to the display control unit 13. Accordingly, the display control unit 13 sequentially displays, on the display device 2, an image in which the meter image showing the process of shifting from the first layout to the second layout is synthesized with the background image, and then displays an image in which the during-connection-processing image is synthesized with the meter image of the adopted second layout and the background image.

Figure 8:
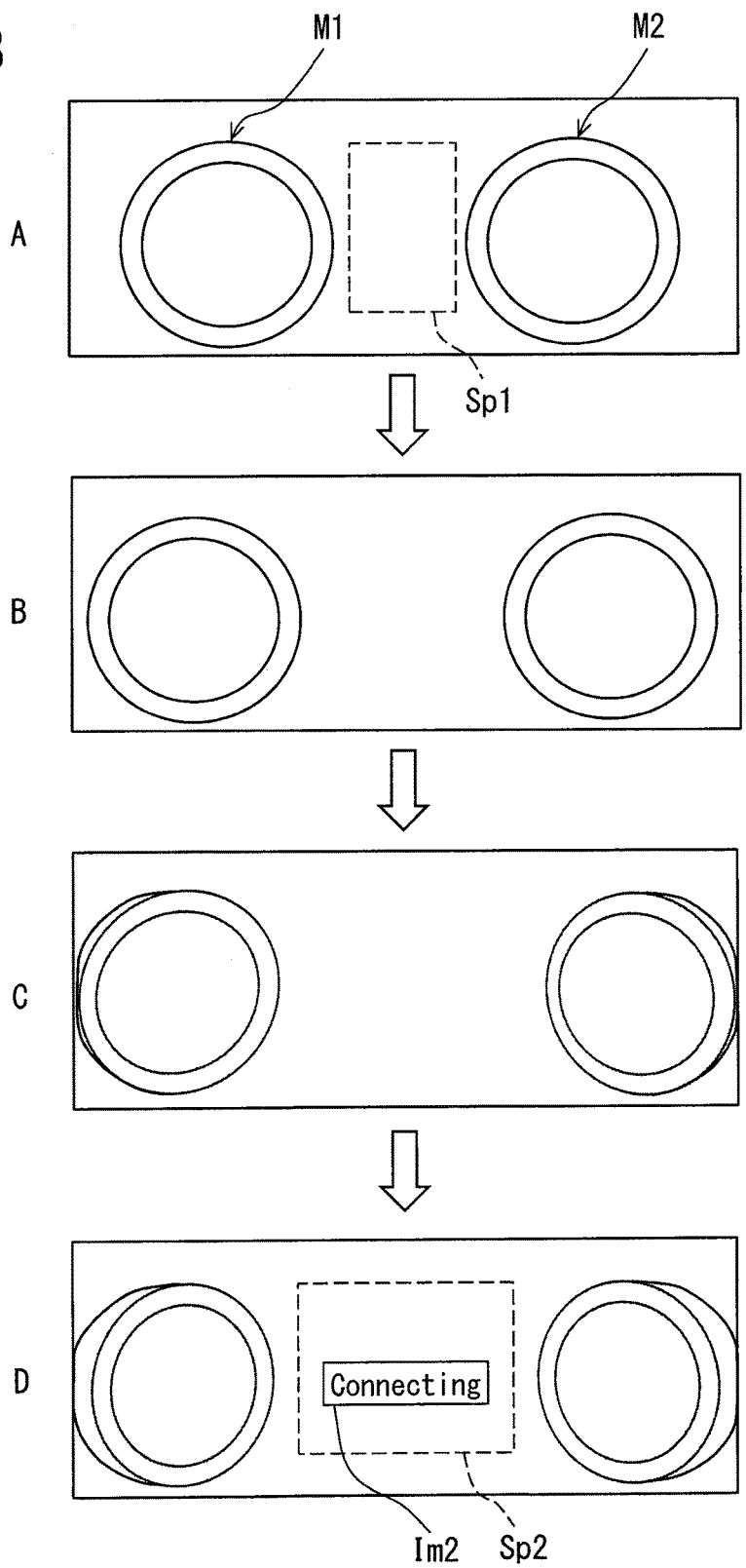
FIG. 8 is a schematic diagram showing an example of image transition on a display device when the display of the during-connection-processing image is started during stopping.

With reference to FIG. 8, an example of image transition on the display device 2 when the display of the during-connection-processing image is started during stopping will be described. In FIG. 8, for convenience, only the rotation speed meter M1 and the vehicle speed meter M2 are shown as element images in the meter image.

As shown in part A of FIG. 8, the image in which the meter image of the adopted first layout is synthesized with the background image is displayed on the display device 2 until the start of the step S25.

Then, when the step S25 starts, the image in which the meter image showing the process of shifting from the first layout to the second layout is synthesized with the background image is sequentially displayed on the display device 2, as shown in parts B, C of FIG. 8. Thereby, the image in which the region sandwiched between the rotation speed meter M1 and the vehicle speed meter M2 gradually expands is sequentially displayed on the display device 2. As a result, animation display in which the new display region appears to be gradually intruding in the meter image is performed.

In the process of shifting from the first layout to the second layout, the rotation speed meter M1 and the vehicle speed meter M2 are separating left and right by lateral movement; accordingly, the region sandwiched between the rotation speed meter M1 and the vehicle speed meter M2 is gradually expanding. In addition, by gradual transition to an image in which the rotation speed meter M1 and the vehicle speed meter M2 appear to tilt with respect to the display surface of the display device 2, the region sandwiched between the rotation speed meter M1 and the vehicle speed meter M2 is gradually expanding.

Then, as shown in part D of FIG. 8, the image in which the during-connection-processing image is synthesized with the image in which the meter image of the adopted second layout is synthesized with the background image is displayed on the display device 2. The during-connection-processing image is an image that includes text indicating that connection is being processed such as "Connecting" as shown by Im2 in FIG. 8, and is displayed in the mobile screen display region Sp2 of the second layout.

Thus, the animation display in which the new display region appears to be gradually intruding in the meter image is performed until the during-connection-processing image is displayed, thereby making it possible to distract the user's consciousness to the waiting time until the mobile screen information is displayed on the display device 2 and make the user hardly feel the waiting time long.

Further, in S25, when the display control unit 13 displays the image in which the during-connection-processing image is synthesized with the meter image of the adopted second layout and the background image; since the vehicle is during stopping and there is no possibility of hindering the driving operation, the animation display in which the region where the during-connection-processing image is displayed is gradually increasing is performed. As a merit of performing the animation display in which the region where the during-connection-processing image is displayed is gradually increasing, it is possible to distract the user's consciousness to the waiting time until the mobile screen information is displayed on the display device 2 and make the user hardly feel the waiting time long, by the performance of the animation display.

Figure 9:
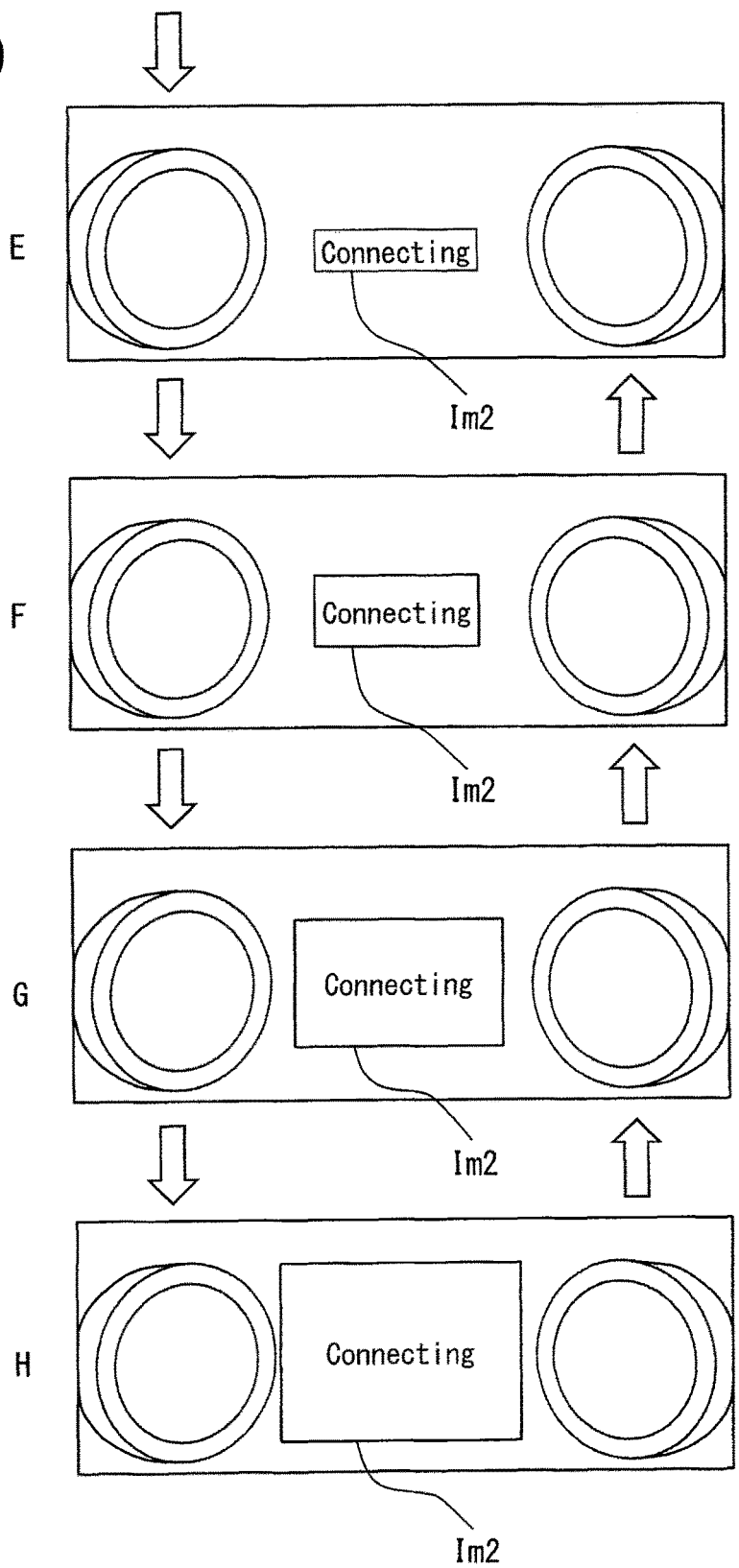
FIG. 9 is a schematic diagram for explaining the animation display of the during-connection-processing image.

With reference to FIG. 9, the animation display of the during-connection-processing image will be described. FIG. 9 is a schematic diagram showing the transition of the during-connection-processing image in the animation display of the during-connection-processing image. In the animation display of the during-connection-processing image, there is repeated a pattern in which, as shown by arrows in FIG. 9, the during-connection-processing image transitions in the order of E, F, G, H in FIG. 9, and then transitions in the order of H, G, F, E.

As the animation display in which the region where the during-connection-processing image is displayed is gradually increasing, animation display in which the shape of the during-connection-processing image (see Im2 in FIG. 9) remains rectangular and the area of the during-connection-processing image is gradually being enlarged can be performed, as shown in parts E to H of FIG. 9. After the area of the during-connection-processing image becomes maximum (see part H of FIG. 9), the transition may be repeated by returning to the pattern of the minimized area (see part E of FIG. 9) of the during-connection-processing image. However, in the present embodiment, after the area of the during-connection-processing image becomes maximum, the transition is repeated by decreasing the area of the during-connection-processing image in a stepwise manner to return to the pattern of the minimized area (see part E of FIG. 9) of the during-connection-processing image, as described above.

In S26, when the communication unit 14 acquires the mobile screen information in S8 of the flowchart of FIG. 5 (YES in S26), the flow moves to S27. On the other hand, when the communication unit 14 does not acquire the mobile screen information (NO in S26), the flow moves to S29.

In S27, the travel determination unit 17 determines whether or not the vehicle is during traveling, based on a vehicle speed acquired from the in-vehicle ECU group 4. When it is determined that the vehicle is during traveling (YES in S27), the flow moves to S28. On the other hand, when it is determined that the vehicle is during stopping (NO in S27), the flow moves to S9.

In S28, the display control unit 13 determines the adoption of the first layout, and instructs the meter image generation unit 12 to generate the meter image in the first layout. Then, the display control unit 13 displays, on the display device 2, an image in which a preparation completion image indicating the completion of preparation for displaying the mobile screen information is synthesized with the meter image of the adopted first layout and the background image.

In S28, although it is possible to display the mobile screen information on the display device 2; since the vehicle is during traveling, the display control unit 13 displays the preparation completion image on the display device 2 by a still image. The preparation completion image is an image that includes text indicating the completion of preparation for displaying the mobile screen information, such as "preparation completion", and can be displayed in the region Sp1 of the first layout. After S28, the flow returns to S27 to repeat processing.

In S29 after the communication unit 14 does not acquire the mobile screen information in S26, the travel determination unit 17 determines whether or not the vehicle is during traveling, based on a vehicle speed acquired from the in-vehicle ECU group 4. When it is determined that the vehicle is during traveling (YES in S29), the flow moves to S30. On the other hand, when it is determined that the vehicle is during stopping (NO in S29), the flow returns to S25 to repeat processing.

In S30, the display control unit 13 stops the animation display in which the region where the during-connection-processing image is displayed is gradually increasing, continued from S25, and displays, on the display device 2, an image displayed when the animation display is stopped, as a still image. Then, the flow returns to S29 to repeat processing.

Figure 6:
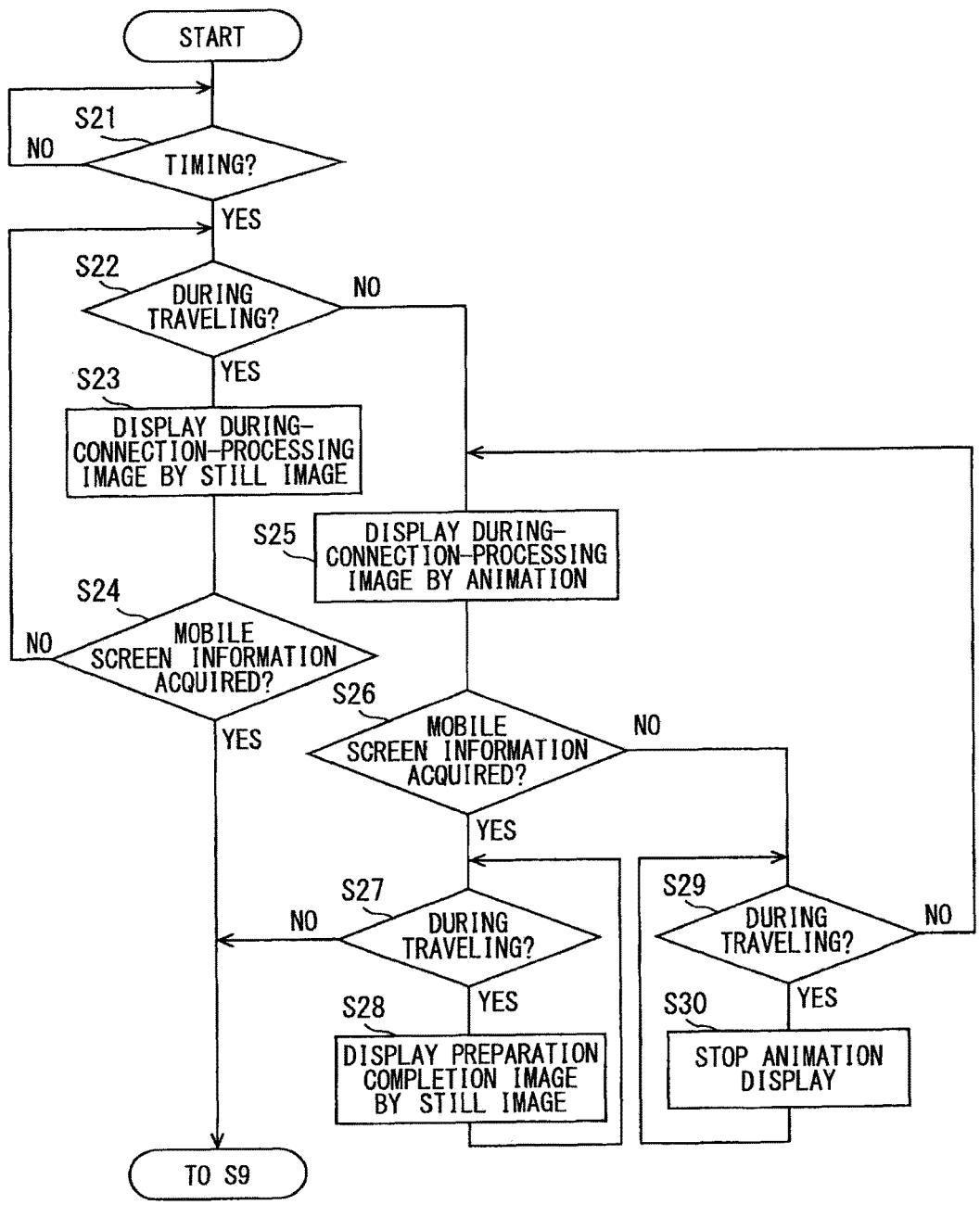
FIG. 6 is a flowchart showing an example of the flow of during-waiting-time display processing by the HCU.
Figure 10:
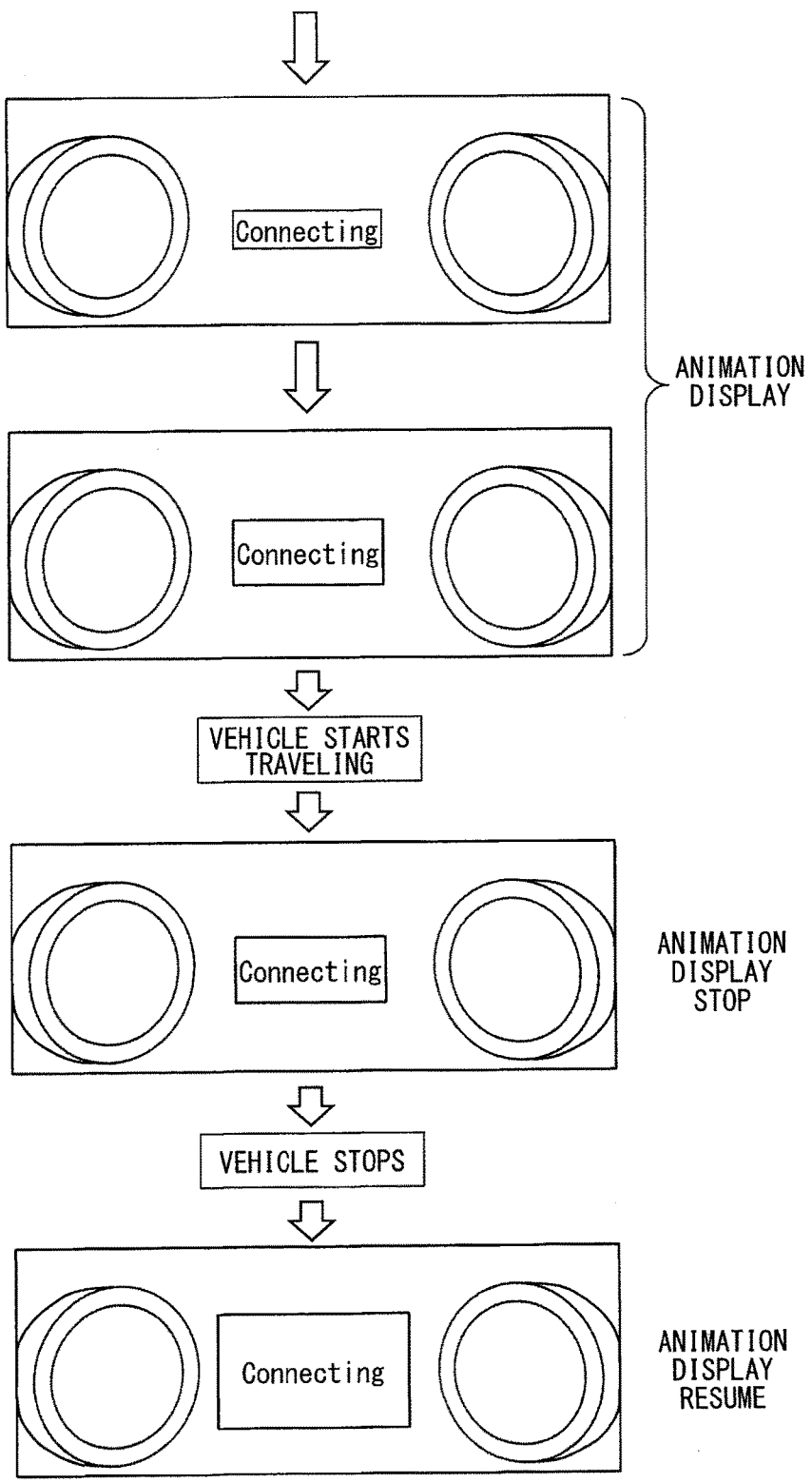
FIG. 10 is a schematic diagram for explaining the animation display of the during-connection-processing image according to a traveling state.

That is, according to the flowchart of FIG. 6, as shown in FIG. 10, when the vehicle starts traveling in the middle of the animation display of the during-connection-processing image, the animation display of the during-connection-processing image is stopped, and the still image of the during-connection-processing image is displayed. Then, when the vehicle stops, the animation display of the during-connection-processing image is resumed. Accordingly, by stopping the animation display during vehicle traveling, it is possible not to hinder the driving operation.

<Summary of Display Modes of Images Displayed on Display Device 2>

Figure 11:
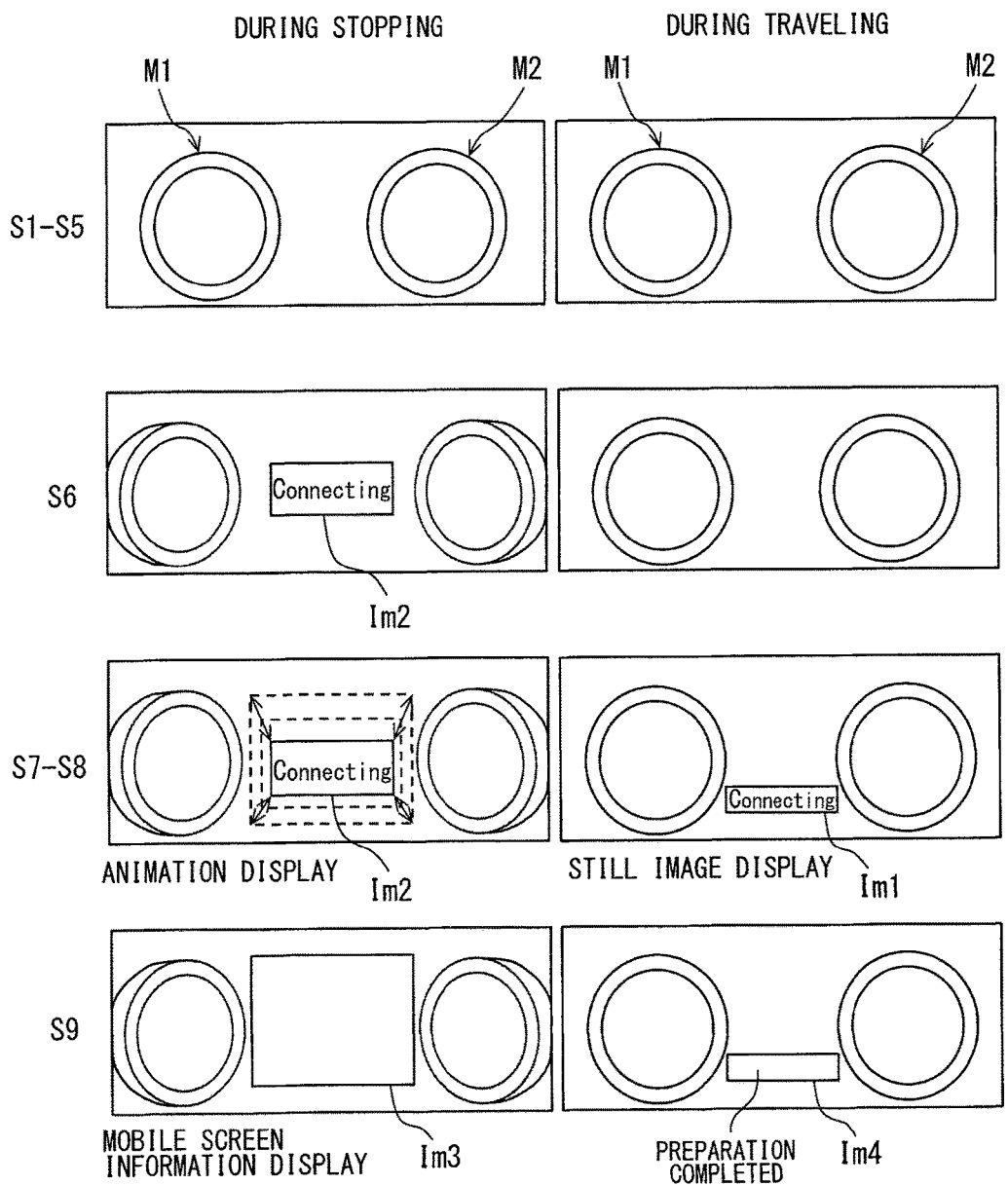
FIG. 11 is a schematic diagram for explaining the display mode of the image displayed on the display device for each traveling state of the vehicle in each step of the flowchart of FIG. 5.

Next, with reference to FIG. 11, the display mode of the image displayed on the display device 2 for each traveling state of the vehicle in each step of the flowchart of FIG. 5 will be described. In FIG. 11, for convenience, only the rotation speed meter M1 and the vehicle speed meter M2 are shown as element images in the meter image.

First, in S1 to S5 after the physical connection between the mobile terminal 3 and the HCU 1 is started until it is authenticated that the mobile terminal 3 is an object that can provide the mobile screen information, the image in which the meter image of the adopted first layout is synthesized with the background image is displayed in both cases where the vehicle is during stopping and during traveling.

Then, in S6 where the control of the mobile terminal 3 is started; during traveling, the same image as in S1 to S5 is displayed, whereas during stopping, the image (Im2 in FIG. 11) in which the during-connection-processing image is synthesized with the meter image of the adopted second layout and the background image is displayed.

Then, in S7 to S8 after the control of the mobile terminal 3 is started until the communication unit 14 acquires the mobile screen information; during stopping, the animation display in which the region where the during-connection-processing image is displayed is gradually increasing is performed, as described with reference to FIG. 9. On the other hand, during traveling, the still image of the during-connection-processing image (Im1 in FIG. 11) in which the during-connection-processing image is synthesized with the meter image of the adopted first layout and the background image is displayed.

Then, in S9 where the mobile screen information becomes possible to be displayed on the display device 2; during stopping, the image (Im3 in FIG. 11) in which the mobile screen information is synthesized with the meter image of the adopted second layout and the background image is displayed. On the other hand, during traveling, the image (Im4 in FIG. 11) in which the preparation completion image is synthesized with the meter image of the adopted first layout and the background image is displayed. The display of the preparation completion image is maintained until the vehicle stops. When the vehicle stops, the image in which the mobile screen information is synthesized with the meter image of the adopted second layout and the background image is displayed.

<Summary of First Embodiment>

According to the configuration of the first embodiment, the during-connection-processing image indicating that connection is being processed is not displayed in a time period after the mobile terminal 3 and the HCU 1 are physically connected until it is authenticated that the mobile terminal 3 is an object that can provide the mobile screen information. Therefore, in comparison with the configuration for displaying the during-connection-processing image in a time period after the mobile terminal 3 and the HCU 1 are physically connected until the mobile screen information becomes possible to be displayed on the display device 2, it is possible to shorten the display period of the during-connection-processing image and make the user hardly feel the waiting time long. Further, by displaying the during-connection-processing image after the connection processing is completed, the user can feel the time from the start of the connection processing to the display of the mobile screen information on the display device 2 to be shorter than it actually is.

Further, by shortening the display period of the during-connection-processing image, it is possible to reduce occasions where the user gazes at the display to see when the connection processing will end, and therefore hardly hinder driving. As a result, it is possible to restrict the user from feeling the waiting time required from the start of the connection processing to the display of the mobile screen information to be long while hardly hindering driving when connecting the mobile terminal 3 to the HCU 1 and displaying the mobile screen information provided from the mobile terminal 3 on the display device 2.

Further, even when the connection processing is completed and the mobile screen information becomes possible to be displayed on the display device 2 when the vehicle is during traveling, the mobile screen information is not displayed immediately, but the mobile screen information is displayed when the vehicle is during stopping, which also makes it possible to hardly hinder driving.

(First Modification)

While in the first embodiment, the steps S27, S28 are executed in the flowchart of FIG. 6, the present disclosure is not necessarily limited thereto. For example, in S26, when the communication unit 14 acquires the mobile screen information, the flow may move to S9. That is, regardless of whether or not the vehicle is during traveling, when the communication unit 14 acquires the mobile screen information, the display control unit 13 may display the mobile screen information on the display device 2.

(Second Modification)

While in the first embodiment, the animation display of the during-connection-processing image is repeated until the communication unit 14 acquires the mobile screen information in S26 in the flowchart of FIG. 6, the present disclosure is not necessarily limited thereto. For example, when the information of the image size, prior to the mobile screen information, transmitted from the mobile terminal 3 is acquired, the animation display in which the during-connection-processing image is gradually being enlarged can be stopped at a size according to the acquired image size. Then, when the mobile screen information is acquired, the mobile screen information can be displayed by the size according to the image size acquired from the mobile terminal 3, in the region where the during-connection-processing image is displayed.

With this, it is possible to set the size of the display region of the image displayed on the display device 2 in advance before the mobile screen information becomes possible to be displayed, which can make the user hardly feel the waiting time until the display of the mobile screen information on the display device 2 accordingly.

(Third and Fourth Modifications)

In the first embodiment, when the animation display in which the region where the during-connection-processing image is displayed is gradually increasing is performed, the animation display in which the shape of the during-connection-processing image is fixed and the area of the during-connection-processing image is gradually being enlarged is performed; however, the present disclosure is not necessarily limited thereto.

Figure 12:
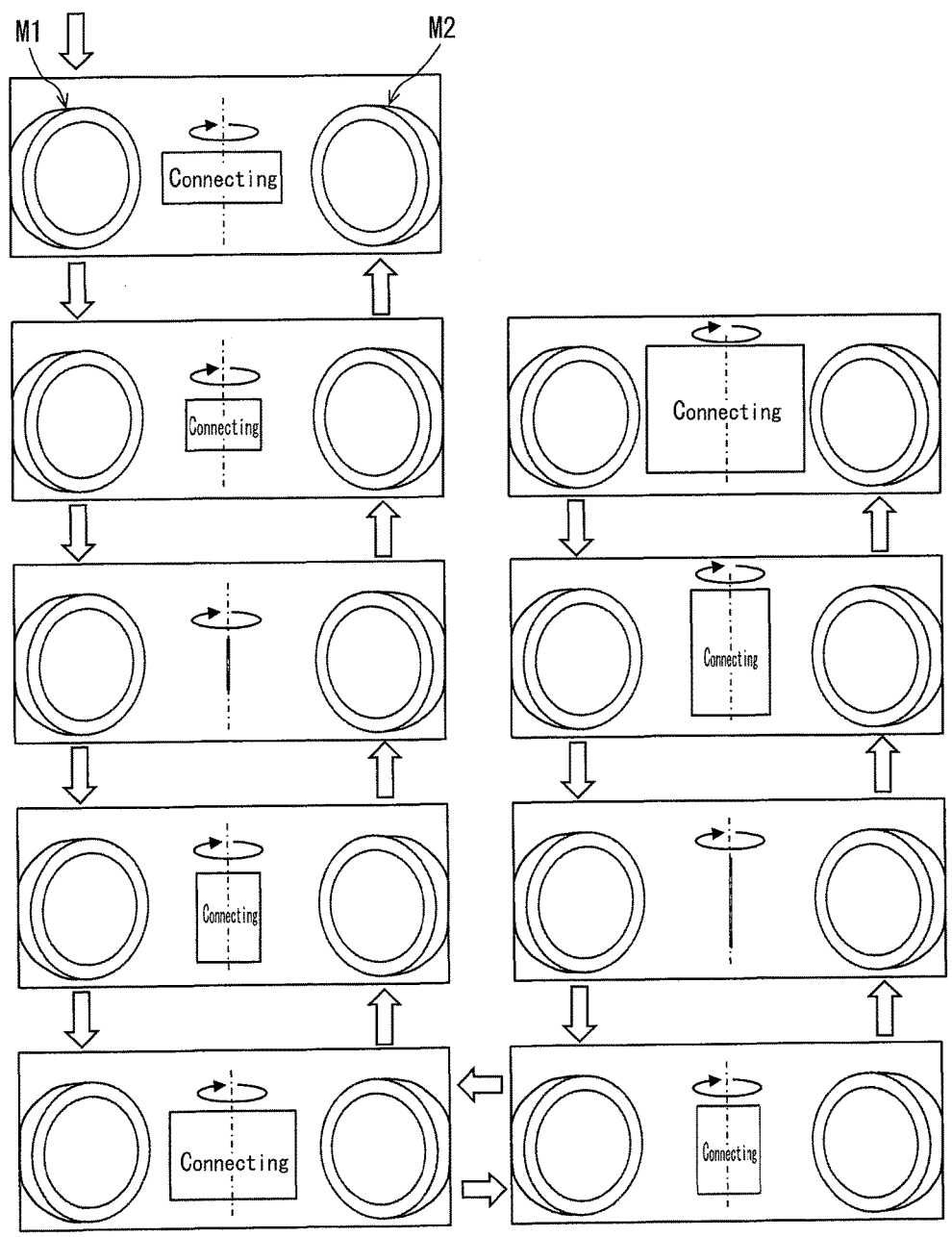
FIG. 12 is a schematic diagram for explaining another example of the animation display in which a region where the during-connection-processing image is displayed is gradually increasing.
Figure 13:
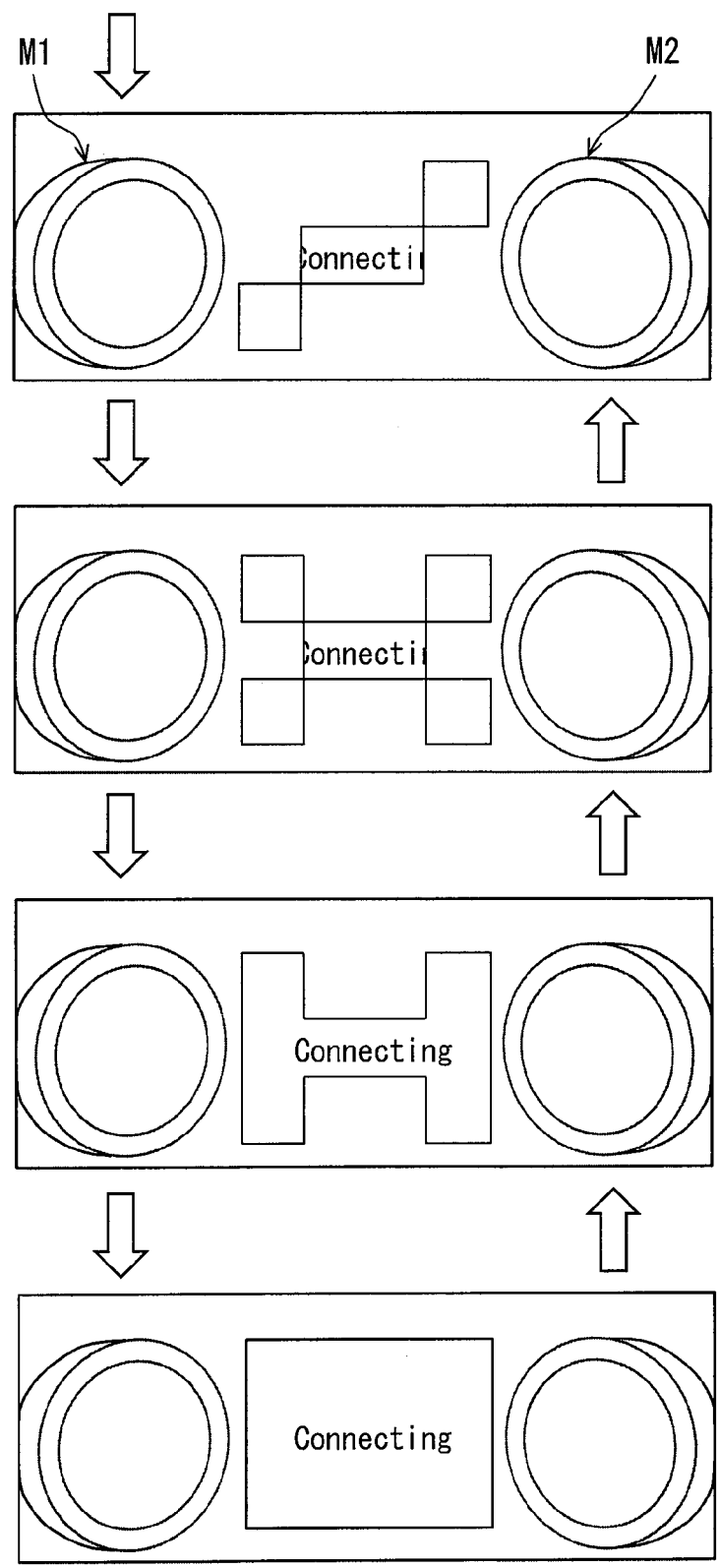
FIG. 13 is a schematic diagram for explaining yet another example of the animation display in which a region where the during-connection-processing image is displayed is gradually increasing.

For example, as shown in FIG. 12, animation display in which the during-connection-processing image is gradually being enlarged while being rotated may be performed (third modification). In the third modification, an axis around which the during-connection-processing image rotates can be arbitrarily set, and is not limited to the example shown in FIG. 12. Alternatively, as shown in FIG. 13, the number of partial images displayed among a plurality of partial images into which the during-connection-processing image is divided may be gradually increased until the during-connection-processing image can be restored (fourth modification).

(Fifth and Sixth Modifications)

In the first embodiment, in the flowchart of FIG. 6, when it is authenticated that the mobile terminal 3 is an object that is USB-connected to the HCU 1 and can provide the mobile screen information, the timing determination unit 16 determines that it is timing to display the during-connection-processing image; however, the present disclosure is not necessarily limited thereto.

For example, the timing determination unit 16 may determine that timing when the communication between the HCU 1 and the mobile terminal 3 is established after the timing when the mobile terminal 3 is authenticated is timing to display the during-connection-processing image (fifth modification). Alternatively, a timer circuit or the like may count a time elapsed from the start of processing of connection between the HCU 1 and the mobile terminal 3, and when the time from the start of the connection processing reaches a predetermined time, the timing determination unit 16 may determine that it is timing to display the during-connection-processing image (sixth modification).

(Seventh Modification)

In the first embodiment, the rotation speed meter M1 indicating the engine speed and the vehicle speed meter M2 indicating the vehicle speed are exemplified as two instrument images indicating the current numerical values of instruments of the vehicle by the circular dial; however, the present disclosure is not necessarily limited thereto. For example, an image indicating the remaining fuel amount may be displayed instead of the engine speed, or other instrument images may be displayed as two instrument images.

(Eighth Modification)

While the first embodiment has been described by way of example in which the vehicle display system 100 is applied to the engine vehicle, the present disclosure is not necessarily limited thereto. For example, the vehicle display system 100 may be applied to an electric vehicle or a hybrid vehicle. When the vehicle display system 100 is applied to the electric vehicle or the hybrid vehicle, a traveling motor speed can be used instead of the engine speed, or a remaining charge amount of a traveling battery can be used instead of the remaining fuel amount.

(Ninth Modification)

While in the first embodiment, the HCU 1 and the display device 2 are configured separately, the invention is not necessarily limited thereto. For example, the HCU 1 and the display device 2 may be configured integrally.

Each flowchart or processing of the flowchart described in this application includes a plurality of sections (or referred to as steps), and each section is expressed as, e.g., S100. Further, each section can be divided into a plurality of subsections, whereas a plurality of sections can be integrated into one section. Further, each section thus configured can be referred to as a device, a module, means.

While the present disclosure has been described in accordance with the above embodiments, it is understood that the present disclosure is not limited to the above embodiments and structures. The present disclosure embraces various changes and modifications within the range of equivalency. In addition, various combinations and modifications and other combinations and modifications including only one element or more or less than one element are within the scope and sprit of the present disclosure.

What is claimed is:

1. A vehicle display control device that is mounted in a vehicle, the vehicle display control device comprising:
   a reception unit that receives screen information provided from a mobile terminal connected to the vehicle display control device;
   a display control unit that displays, on a display device, the screen information received by the reception unit from the mobile terminal; and
   a timing determination unit that determines a predetermined timing in a lapse of time after processing of connection between the vehicle display control device and the mobile terminal is started,
   wherein the display control unit displays a during-connection-processing image indicating that connection with the mobile terminal is being processed, on the display device in a time period after the timing is determined by the timing determination unit until the screen information becomes possible to be displayed on the display device, and refrains from displaying the during-connection-processing image on the display device in a time period after the connection processing is started until the timing is determined by the timing determination unit.

2. The vehicle display control device according to claim 1, wherein
   the display control unit
   displays an image on the display device before the connection processing is started, and
   when displaying the during-connection-processing image on the display device, displays the during-connection-processing image in addition to the image displayed on the display device before the connection processing is started.

3. The vehicle display control device according to claim 2, wherein
   the display control unit performs animation display in which a new display region appears to be gradually intruding in the image displayed on the display device before the connection processing is started, and then displays the during-connection-processing image in the new display region.

4. The vehicle display control device according to claim 1, wherein
   the display control unit, when displaying the during-connection-processing image on the display device, performs animation display in which a region where the during-connection-processing image is displayed is gradually increasing.

5. The vehicle display control device according to claim 4, wherein
   the display control unit, when displaying the during-connection-processing image on the display device, performs animation display in which a shape of the during-connection-processing image is fixed and an area of the during-connection-processing image is gradually being enlarged.

6. The vehicle display control device according to claim 5, wherein
   the reception unit receives information of an image size for displaying the screen information on the display device, prior to receiving the screen information, after the processing of connection between the vehicle display control device and the mobile terminal is started, and
   the display control unit repeats, until the reception unit receives the information of the image size, the animation display in which the region where the during-connection-processing image is displayed is gradually increasing, stops the animation display at a size according to the image size when the reception unit receives the information of the image size, and displays the screen information in the region where the during-connection-processing image is displayed when the reception unit receives the screen information.

7. The vehicle display control device according to claim 4, wherein
the display control unit, when displaying the during-connection-processing image on the display device, performs animation display in which the during-connection-processing image is gradually being enlarged while being rotated.

8. The vehicle display control device according to claim 4, wherein
the display control unit repeats, until the screen information becomes possible to be displayed on the display device, the animation display in which the region where the during-connection-processing image is displayed is gradually increasing.

9. The vehicle display control device according to claim 4, comprising a travel determination unit that determines whether the vehicle is during traveling or during stopping, wherein
the display control unit, at the time of displaying the during-connection-processing image, performs the animation display in which the region where the during-connection-processing image is displayed is gradually increasing when the travel determination unit determines that the vehicle is during stopping, but at the time of displaying the during-connection-processing image, refrains from performing the animation display when the travel determination unit determines that the vehicle is during traveling.

10. The vehicle display control device according to claim 9, wherein
the display control unit displays the during-connection-processing image in a state of stopping the animation display when the travel determination unit determines that the vehicle is during traveling while performing the animation display in which the region where the during-connection-processing image is displayed is gradually increasing, and then resumes the animation display when the travel determination unit determines that the vehicle is during stopping.

11. The vehicle display control device according to claim 1, wherein
the vehicle display control device is connected to the mobile terminal by wire,
the vehicle display control device comprising an object determination unit that determines whether or not the mobile terminal connected to the vehicle display control device is a mobile terminal that can provide the screen information, after the processing of connection between the vehicle display control device and the mobile terminal is started, wherein
the timing determination unit determines the timing when the object determination unit determines that the mobile terminal connected to the vehicle display control device is a mobile terminal that can provide the screen information.

12. The vehicle display control device according to claim 1, wherein
the timing determination unit determines the timing when a predetermined time elapses after the connection processing is started.

13. A vehicle display system comprising:
the vehicle display control device according to claim 1; and
a display device that displays an image in accordance with the vehicle display control device.

14. The vehicle display system according to claim 13, wherein
the display device displays an instrument image that is an image of an instrument of the vehicle.

15. The vehicle display system according to claim 14, wherein
the display device
displays two parallelly arranged instrument images based on a cylindrical solid model whose top face is a circular dial indicating a current numerical value of the instrument and whose height is smaller than a radius of the dial,
when displaying a during-connection-processing image indicating that connection with the mobile terminal is being processed, performs animation display in which the two instrument images of the solid model viewed from the front of the dial are not only separating from each other but also gradually transitioning to the two instrument images of the solid model viewed from an angle inclined from the front of the dial, so that a new display region appears to be gradually intruding, and then displays the during-connection-processing image in the new display region.

16. A vehicle display system that is mounted in a vehicle, the vehicle display system comprising:
a display device that displays an instrument image that is an image of an instrument of the vehicle;
a vehicle display control device comprising a reception unit that receives screen information provided from a mobile terminal connected to the vehicle display control device and a display control unit that displays, on the display device, the screen information received by the reception unit from the mobile terminal;
a timing determination unit that determines a predetermined timing in a lapse of time after processing of connection between the vehicle display control device and the mobile terminal is started; and
a travel determination unit that determines whether the vehicle is during traveling or during stopping, wherein
the display control unit
performs animation display in which the region where the during-connection-processing image indicating that connection with the mobile terminal is being processed is displayed is gradually increasing when the travel determination unit determines that the vehicle is during stopping, in a time period after the timing is determined by the timing determination unit until the screen information becomes possible to be displayed on the display device, but performs still image display of the during-connection-processing image when the travel determination unit determines that the vehicle is during traveling,
refrains from displaying the during-connection-processing image on the display device in a time period after the connection processing is started until the timing is determined by the timing determination unit, and
performs still image display of the during-connection-processing image in a state of stopping the animation display when the travel determination unit determines that the vehicle is during traveling while performing the animation display, and then resumes the animation display when the travel determination unit determines that the vehicle is during stopping.

\* \* \* \* \*